UNITED STATES PATENT OFFICE.

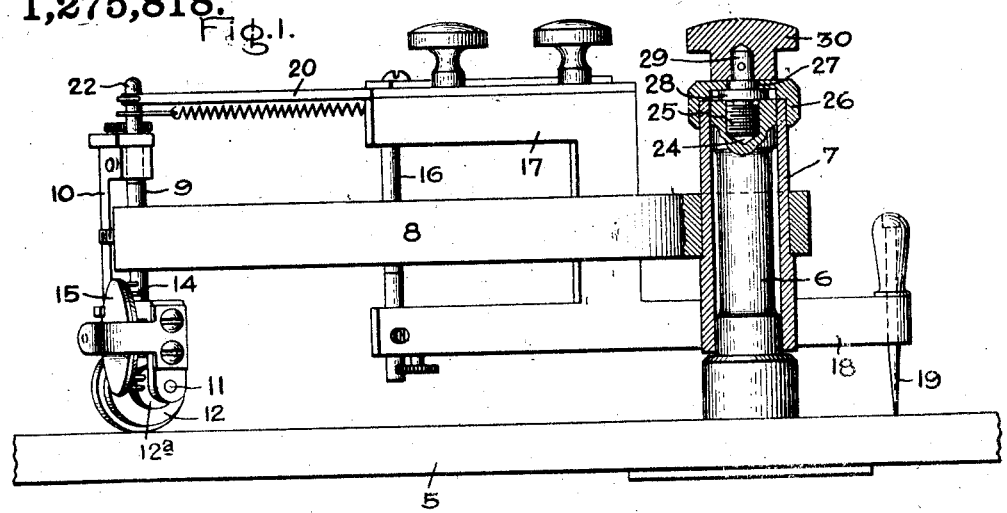
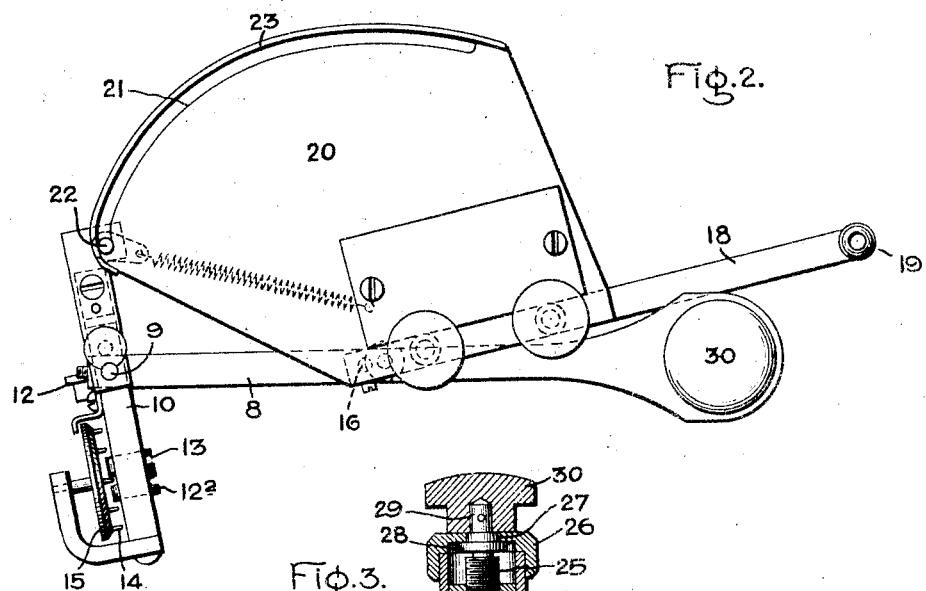
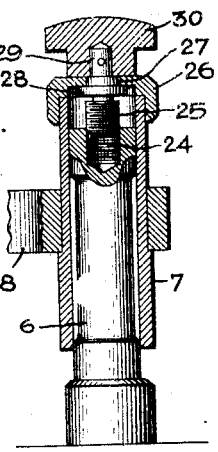

REW E. WOOLLEY, OF SCHENECTADY, NEW YORK, ASSIGNOR TO GENERAL ELECTRIC COMPANY, A CORPORATION OF NEW YORK.

MEASURING INSTRUMENT.

1,275,818.

Specification of Letters Patent. Patented Aug. 13, 1918.

Application filed August 30, 1917. Serial No. 189,000.

*To all whom it may concern:*

Be it known that I, REW E. WOOLLEY, a citizen of the United States, residing at Schenectady, county of Schenectady, State of New York, have invented certain new and useful Improvements in Measuring Instruments, of which the following is a specification.

The present invention relates to measuring instruments, and more particularly to planimeters, although not necessarily limited thereto.

The object of the invention is to provide an improved structure in an instrument of this type, and for a consideration of what I believe to be novel and my invention, attention is directed to the accompanying specification and the claims appended thereto.

In the drawing, Figure 1 is a side elevation, partly in section, of a planimeter embodying my invention; Fig. 2 is a top plan view thereof, and Fig. 3 is a sectional view of a portion of the instrument.

The planimeter shown is one adapted for use in connection with flow meter charts to integrate a record which has been traced thereon. 5 indicates a base plate having a post 6 projecting therefrom which serves to center a chart on the base plate and also acts as a central pivot for the planimeter. The planimeter comprises a sleeve 7 to which is fixed an arm 8 extending at right angles thereto. On the end of arm 8 is a vertical pin 9 on which is pivoted a frame 10. Pivoted in the frame 10 on a horizontal axis 11 is a friction wheel 12 which turns on its axis when moved over the chart, and connected to the friction wheel to be turned thereby is a hub 12ª having a groove 13 which engages pins 14 on an indicating wheel 15. On the arm 8 between its ends is a vertical pivot pin 16 on which is pivoted a frame 17 having an arm 18 in the end of which is a tracing point 19. On frame 17 is also a cam plate 20 having a cam surface 21 on which rides a pin 22 carried by frame 10 at one side of its pivot. 23 is a guard to hold the pin 22 in engagement with the cam surfaces 21.

The structure thus far described is that of a known type of planimeter, the operation of which is well understood, and a more detailed description is deemed unnecessary to an understanding of the present invention. Briefly the operation of such a planimeter is as follows:

The instrument is removed from the base plate 5, a circular chart is put in place thereon the center of the chart fitting over the post 6 to position it and hold it in place. The instrument is then put back again, the sleeve 7 fitting over post 6 and the friction wheel 12 engaging the chart. The planimeter is then pulled around by the handle on the tracing point 19, the point being pulled along the record line on the chart. The circular movement of the point 19 about the post 6 as a center moves the friction wheel 12 on a circumference around post 6 and the movement of the point 19 about the pivot 16 which results in varying the radial distance of point 19 from center post 6 turns the cam plate 20 and through pin 22 turns the frame 10, and hence the friction wheel 12 on the vertical pivot pin 9. The amount which the friction wheel turns on its horizontal pivot 11 in moving around the post 6 depends on the angle which it makes with the radius passing through its point of engagement with the chart as is well understood.

Now the friction wheel 12 of a planimeter must be pivoted on frictionless bearings and be very carefully mounted if accurate results are to be obtained, and heretofore these pivots have often been damaged by the manipulator in placing the instrument in position on the base 5, this being caused in general by accidentally or otherwise dropping the sleeve 7 over the post 6 in such a manner as to strike the friction wheel on the base 5. According to my invention, I provide an improved arrangement which acts as a safety device to prevent the planimeter wheels being injured when the planimeter is being put into position on the base 5. To this end the top of the post 6 is provided with a threaded socket 24 into which screws a stud 25 carried by the sleeve 7. In the present instance the sleeve has a cap 26 fixed over its outer end in which is an opening 27, and the stud 25 is provided with a collar 28 which engages the under surface of cap 26 and an end 29 which projects freely through opening 27 and has fastened to it a knurled head 30. This pivots the stud 25 in the cap 26 so it may be turned by means of the knurled head 30. When the planimeter is to be placed on the base, the sleeve 7 is placed over the post 6 and lowered. It cannot slip over the post far enough, however, to bring friction wheel 12 into engagement with the base 5, but can only go down until the stud 25 strikes the top of the post 6 as indicated in Fig. 3. To lower the instrument the rest of the way, the knurled head 30 is turned to screw the stud 25 into the socket 24 which will slowly move the planimeter toward the base. The arrangement is such that the friction wheel 22 will just engage the chart when the stud 25 is screwed down as far as it will go. The threads on the stud 25 and in socket 24 may have a suitable pitch so as to lower the planimeter as slowly as found desirable.

This arrangement, it will be seen, while it permits of the planimeter being quickly and expeditiously put into place over the base 5, prevents any possible injury to the instrument as it must be always slowly moved through the screw arrangement during the latter part of its lowering movement.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. The combination with a sleeve member and a post member which telescope one within the other, of a measuring device carried by one of said members and adapted to be brought to an operative position when said members are telescoped one within the other, and means carried by one member and coöperating with the other by means of which the two members are positively moved during a portion of the movement by which they are brought into telescoping relation.

2. In a measuring instrument, the combination with a sleeve member and a post member which telescope one within the other to bring the measuring instrument to operative position, of means carried by one member and engaging the other and through which the latter part of the telescoping movement is effected by a turning movement of the members whereby injury of the instrument due to the two members being quickly telescoped to final position is prevented.

3. In a measuring instrument, the combination with a post, and a sleeve which fits over it, of a threaded member carried by the sleeve which engages the post before the sleeve reaches its final position thereon, said post having a threaded part for engagement with said threaded member whereby the sleeve may be lowered therethrough to its final position.

4. The combination with a base having a pivot post thereon, of a measuring instrument having a sleeve which fits over the post and a pivot wheel which engages the base, and means for preventing the wheel from being brought forcibly into engagement with the base when the sleeve is placed over the pivot post comprising a screw thread by means of which the sleeve is lowered during its final movement.

5. The combination with a base having a pivot post thereon, of a measuring instrument having a sleeve which fits over the post and a pivot wheel which engages the base, and means for preventing the wheel from being brought forcibly into engagement with the base when the sleeve is placed over the pivot post comprising a threaded member swiveled in the top of the sleeve, and which engages the top of the post before the wheel engages the base, said post having a threaded part which coöperates with said threaded member and by means of which the sleeve is lowered during its final movement.

In witness whereof I have hereunto set my hand this 29th day of August, 1917.

REW E. WOOLLEY.